July 12, 1960     C. R. JOHNSTON     2,944,660

PERFORATED CONVEYOR FOR POTATO DIGGERS AND THE LIKE

Filed March 19, 1959

INVENTOR.
CLAIR R. JOHNSTON
BY
Oldham & Oldham
ATTYS.

United States Patent Office 2,944,660
Patented July 12, 1960

2,944,660

PERFORATED CONVEYOR FOR POTATO DIGGERS AND THE LIKE

Clair R. Johnston, 1397 Firestone Parkway, Akron, Ohio

Filed Mar. 19, 1959, Ser. No. 800,445

4 Claims. (Cl. 198—195)

This invention relates to perforated conveyors capable of use, for example, in a potato digger wherein dirt dug up with the potatoes together with the potatoes are put on the conveyor, the dirt falling through the conveyor and the potatoes being carried by the conveyor to a discharge point.

It is the general object of the invention to improve upon perforate conveyors of the type used with a potato digger or the like by providing a more durable, less expensive, and a more effective conveyor.

Another object of the invention is the provision of a conveyor which is more readily turned around a relatively sharp radius, which is less subject to clogging and breakage, and which will operate for long periods of time with little or no attention and maintenance.

The foregoing objects of the invention, and other objects which will become apparent as the description proceeds, are achieved, in one most specific form of the invention, by the provision of a belt conveyor for potato diggers and the like including a plurality of longitudinally spaced, substantially transversely extending, round, straight metal rods, a plurality of transversely spaced, longitudinally extending flexible metal cables of less than about one-half of the diameter of the rods, said rods being provided with half round grooves to receive the cables, a metal shoe with a half round groove receiving the cable and positioned at each intersection of cable and rod except one rod, means welding each shoe to its associated rod to clamp the cable thereto while the cable is free from welds and preserves its uniform flexibility, the metal shoe being clamped during welding by a force holding the cable against slipping and cooling of the welded parts resulting in shrinkage to increase clamping pressure, said one rod having U-clamps welded thereto at cable intersections, said belt conveyor being made endless by the cable ends being secured in the U-clamps, pulley means riding on the rods and supporting the conveyor, certain of said pulley means being toothed and driven to effect movement of the belt conveyor, and shoes welded to the radially inner side of the rods in longitudinal alignment and laterally between the cables against which agitating means may strike.

For a better understanding of the invention reference should be had to the drawings wherein Fig. 1 is a side elevation of one embodiment of the conveyor of the invention;

Figure 1:
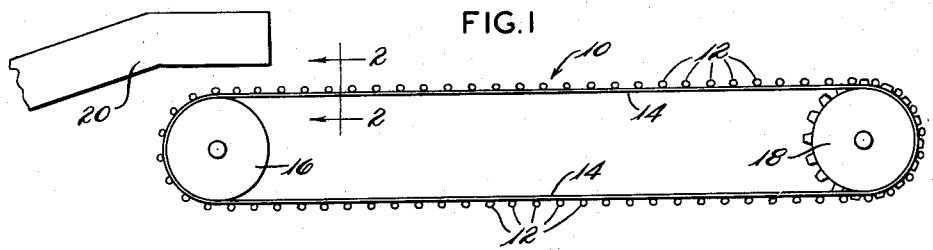

Having more particular reference to the drawings, the numeral 10 indicates generally the perforate conveyor of the invention and including longitudinally spaced generally laterally directed rods 12 secured at their points of intersection to a plurality of flexible cables 14. The conveyor 10 extends around opposed pulley means 16 and 18, with pulley means 18 being appropriately toothed and driven to effect movement of the conveyor.

It will be understood that the conveyor 10 is preferably utilized in a potato digging apparatus, for example shown in my U.S. Patent No. 2,577,525, or in my pending U.S. patent application Serial No. 759,924, filed September 9, 1958, and entitled "Apparatus for Digging Potatoes and the Like." The conveyor 10, as shown in Fig. 1, is adapted to receive from a digger blade or conveyor 20 a mixture of dirt and potatoes, the spacing between the rods 12 being such that all potatoes, except those of very small size, will not be able to fall down between the bars or rods 12, but with the dirt being free to fall therethrough, particularly if the conveyor 10 is agitated during its forward movement.

Figure 2:
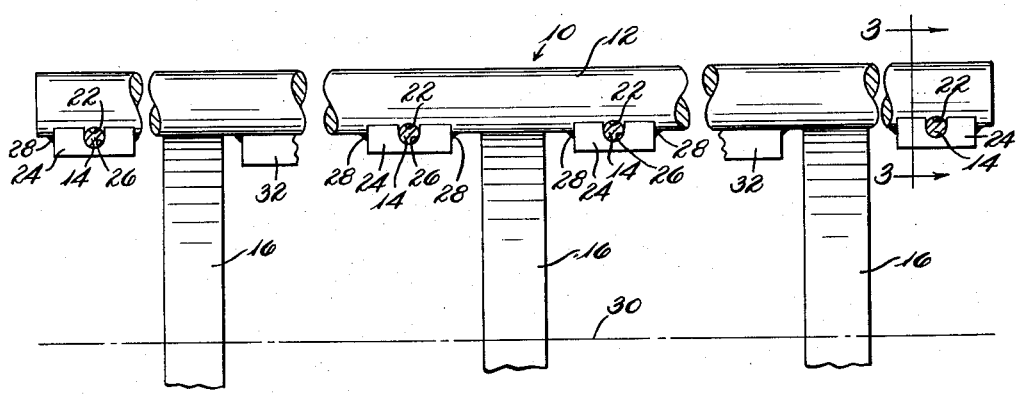
Fig. 2 is an enlarged fragmentary view of the conveyor of Fig. 1 taken substantially on line 2—2 thereof.
Figure 3:
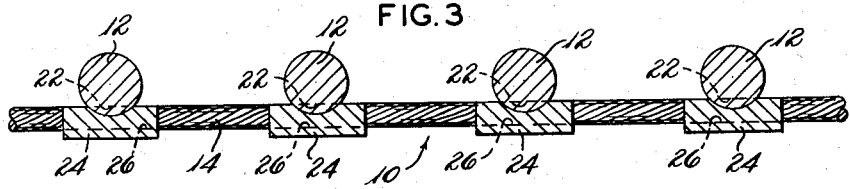
Fig. 3 is a longitudinal cross-sectional view of the conveyor taken substantially on line 3—3 of Fig. 2.

Turning to Figs. 2 and 3, the construction of the conveyor 10 is more evident. The rods 12 are usually round, straight, and substantially rigid metal bars, normally ½ inch or 7/16 inch in diameter, in one typical embodiment, and of a length from about 20 inches to about 55 inches in a normal potato digger, with a 1⅛ inch spacing in a longitudinal direction between the rods. The rods 12 are formed with half round or slightly less than half round openings 22 to receive the flexible cables 14, the cables in a typical embodiment being about 3/16 of an inch in diameter, i.e. less than about one-half of the diameter of the rods 12, and are made up from a plurality of twisted wires, all in known manner.

At each point of intersection between the rods 12 and the cables 14 the cables are secured to the rod by means of metal shoes 24 each made with a half round or slightly less than half round groove 26 for receiving the cable, and with the metal shoes 24 being clamped tightly against the cable to hold it tightly clamped against the rod 12 with the metal shoes 24 then being welded securely to the rods 12 around substantially two sides thereof, and as generally indicated by the numeral 28 so as to clamp the cable against slippage without welding of the cable, the clamp pressure increasing with cooling of the metal due to shrinkage and the cable retaining its uniform flexibility. The cables 14 extend longitudinally of the conveyor 10, and are in laterally spaced relation to each other. In the embodiment of the invention shown four cables 14 are utilized, one cable near each end of the rods, and two cables towards the center of the rods. This construction is satisfactory for a wide conveyor, for example one over three feet in width. A smaller number of cables can be utilized with a relatively narrow perforate conveyor of the type of the invention, or a greater number can be employed if the width of the conveyor is to be increased.

Fig. 2 also illustrates how the pulley means 16 mounted for rotation about a center line 30, support the conveyor 10 by actually engaging with the rods 12 between the cables 14. The pulley means 18 similarly engage the rods 12 but with the teeth engaging between the rods to effect driving of the conveyor by means forming no part of this invention and not shown.

It may be advisable in certain embodiments of the invention to weld a metal plate 32 to the radially inner surface of each rod 12, these plates being some two inches long in the direction of the rod 12, three-quarters of an inch wide, and one-quarter of an inch thick. These plates then serve as wearing surfaces against which agitating means (not shown) may strike to shake or agitate the conveyor 10 to assist in shaking the earth through the conveyor while leaving the potatoes on top of the conveyor.

Figure 4:
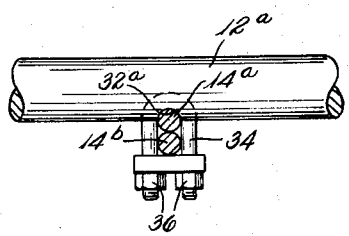
Fig. 4 is a fragmentary view illustrating the manner of clamping the cable ends together in the conveyor.

Fig. 4 illustrates the manner of joining the cable ends together to make the conveyor endless. More specifically, the conveyor is normally made endless, as seen in Fig. 1, and with metal shoes 24 joining the cables to the rods at each intersection of the cables to the rods except for one rod. One rod 12a is provided with a U-bolt 34 adjacent the point of intersection of each cable therewith, the U-bolt 34 having its closed end welded down into a slot in the rod 12a, and with the U-bolt then receiving one cable end 14a down in a half groove 22a, and the other cable end 14b being received on top of the first cable end, both cable ends being compacted tightly in the U-clamp 34 by nuts 36.

It is believed that the structure and operation of the perforate conveyor of the invention will be evident from the foregoing description. Suffice it to say here that the conveyor is particularly strong and flexible, and is able to turn around relatively small pulley diameters due to the inherent flexibility of the cables 14. The pulley means 16 and 18 adequately carry the conveyor with little or no places where dirt or stones can lodge between the pulley means and the conveyor. The construction of the conveyor is comparatively simple and long maintenance-free life is obtained from the conveyor.

While in accord with the patent statutes one best known embodiment of the invention has been illustrated and described in detail, it is to be particularly understood that the invention is not limited thereto or thereby, but that its scope is defined in the appended claims.

What is claimed is:

1. A belt conveyor for potato diggers and the like including a plurality of longitudinally spaced, transversely extending, round, straight metal rods, a plurality of transversely spaced, longitudinally extending flexible metal cables of less than about one-half of the diameter of the rods, said rods being provided with half round grooves to receive the cables, a metal shoe with a half round groove receiving the cable and positioned at each intersection of cable and rod except one rod, means including welding for uniting each shoe to its associated rod at positions spaced from the cable with the cable held under compression therebetween to clamp the cable thereto, said one rod having U-clamps welded thereto at cable intersections, said belt conveyor being made endless by the cable ends being secured in the U-clamps, pulley means riding on the rods and supporting the conveyor, certain of said pulley means being toothed and driven to effect movement of the belt conveyor, and shoes welded to the radially inner side of the rods in longitudinal alignment and laterally between the cables against which agitating means may strike.

2. A belt conveyor for potato diggers and the like including a plurality of longitudinally spaced, transversely extending, round, straight metal rods, a plurality of transversely spaced, longitudinally extending flexible metal cables of less than about one-half of the diameter of the rods, said rods being provided with half round grooves to receive the cables, a metal shoe with a half round groove receiving the cable and positioned at each intersection of cable and rod except one rod, means including welding for uniting each shoe to its associated rod at positions spaced from the cable with the cable held under compression therebetween to clamp the cable thereto, said one rod having U-clamps welded thereto at cable intersections, said belt conveyor being made endless by the cable ends being secured in the U-clamps, and pulley means riding on the rods and supporting the conveyor.

3. A belt conveyor for potato diggers and the like including a plurality of longitudinally spaced, transversely extending, metal rods, a plurality of transversely spaced, longitudinally extending flexible metal cables, said rods being provided with half round grooves to receive the cables, a metal shoe with a half round groove receiving the cable and positioned at each intersection of cable and rod except one rod, weld means uniting each shoe to its associated rod at positions spaced from the cable to clamp the cable thereto, said weld means being under clamping tension due to cooling of the weld, said one rod having U-clamps welded thereto at cable intersections, said belt conveyor being made endless by the cable ends being secured in the U-clamps, and pulley means riding on the rods and supporting the conveyor.

4. A belt conveyor for potato diggers and the like including a plurality of longitudinally spaced, transversely extending, metal rods, a plurality of transversely spaced, longitudinally extending flexible metal cables, said rods being provided with half round grooves to receive the cables, a metal shoe with a half round groove receiving the cable and positioned at each intersection of cable and rod, and weld means welding each shoe to its associated rod to clamp the cable thereto, said cable being free of welds and being clamped by forces due partly at least to shrinkage of the weld means.

References Cited in the file of this patent

UNITED STATES PATENTS

| 527,722 | Sargent et al. | Oct. 16, 1894 |
| 527,723 | Sargent et al. | Oct. 16, 1894 |
| 2,778,480 | Dobbins | Jan. 22, 1957 |

FOREIGN PATENTS

| 313,438 | Germany | July 14, 1919 |